United States Patent
Adar et al.

(10) Patent No.: US 8,249,177 B2
(45) Date of Patent: Aug. 21, 2012

(54) DETECTION OF FRAME MARKER QUALITY

(75) Inventors: Etai Adar, Yokneam Ilit (IL); Michael Bar-Joshua, Haifa (IL); David Stauffer, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 12/397,790

(22) Filed: Mar. 4, 2009

(65) Prior Publication Data

US 2010/0226420 A1    Sep. 9, 2010

(51) Int. Cl.
  *H04L 27/00* (2006.01)
(52) U.S. Cl. ........ 375/259; 375/231; 375/232; 375/356; 375/365; 375/368
(58) Field of Classification Search ............... 375/259, 375/231, 232, 356, 365, 368
See application file for complete search history.

(56) References Cited

U.S. PATENT DOCUMENTS

| 2005/0213556 A1 * | 9/2005 | Wax et al. ........... 370/349 |
| 2010/0067624 A1 * | 3/2010 | Sankabathula et al. ....... 375/345 |

* cited by examiner

*Primary Examiner* — Kabir A Timory
(74) *Attorney, Agent, or Firm* — Matthew C. Zehrer

(57) ABSTRACT

For example, a method of detecting frame marker quality includes: detecting, in a bit-stream sent from a first component to a second component of a common hardware unit, a frame marker having a bit pattern different from an uncorrupted frame marker specified by a communication protocol; and assigning a quality level indicator to the frame marker based on a difference between said bit pattern and a bit pattern of said uncorrupted frame marker.

18 Claims, 3 Drawing Sheets

DETECTION OF FRAME MARKER QUALITY

FIELD OF THE INVENTION

Some embodiments are related to the field of wired communication and more particularly some embodiments are related to detecting frame marker quality.

BACKGROUND OF THE INVENTION

Some computing systems may include, for example, a processor and a memory unit co-located on a common hardware card or Integrated Circuit (IC). The processor and the memory unit may be interconnected through a wired link, and may exchange data over the wired link. For example, the processor may write data into the memory unit, and may read data from the memory unit.

Prior to transfer of payload data over the wired link, predefined frame markers may be transferred over the wired link, in order to facilitate the detection of the particular wired link by the processor and/or the memory card, and in order to allow "locking" of these units on the particular wired link. The wired link that connects the processor and the memory unit may be imperfect, or may have particular characteristics resulting in "noise". Accordingly, the locking process may be time-consuming, or may erroneously fail.

SUMMARY OF THE INVENTION

Some embodiments include, for example, devices, systems, and methods of detection of frame marker quality.

In some embodiments, for example, a method of detecting frame marker quality includes: detecting, in a bit-stream sent from a first component to a second component of a common hardware unit, a frame marker having a bit pattern different from an uncorrupted frame marker specified by a communication protocol; and assigning a quality level indicator to the frame marker based on a difference between said bit pattern and a bit pattern of said uncorrupted frame marker.

In some embodiments, for example, an apparatus for detecting frame marker quality includes: an adaptive equalization engine to detect, in a bit-stream sent from a first component of the apparatus to a second component of the apparatus, a frame marker having a bit pattern different from an uncorrupted frame marker specified by a communication protocol, and to assign a quality level indicator to the frame marker based on a difference between said bit pattern and a bit pattern of said uncorrupted frame marker.

In some embodiments, a system includes an integrated circuit including: a first component including a first transmitter and a first receiver; a second component including a second transmitter and a second receiver; one or more wired communication links to connect the first transmitter with the second receiver, and to connect the second transmitter with the first receiver; and an adaptive equalization engine to detect, in a bit-stream sent from the first transmitter to the second receiver, a frame marker having a bit pattern different from an uncorrupted frame marker specified by a communication protocol, and to assign a quality level indicator to the frame marker based on a difference between said bit pattern and a bit pattern of said uncorrupted frame marker.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
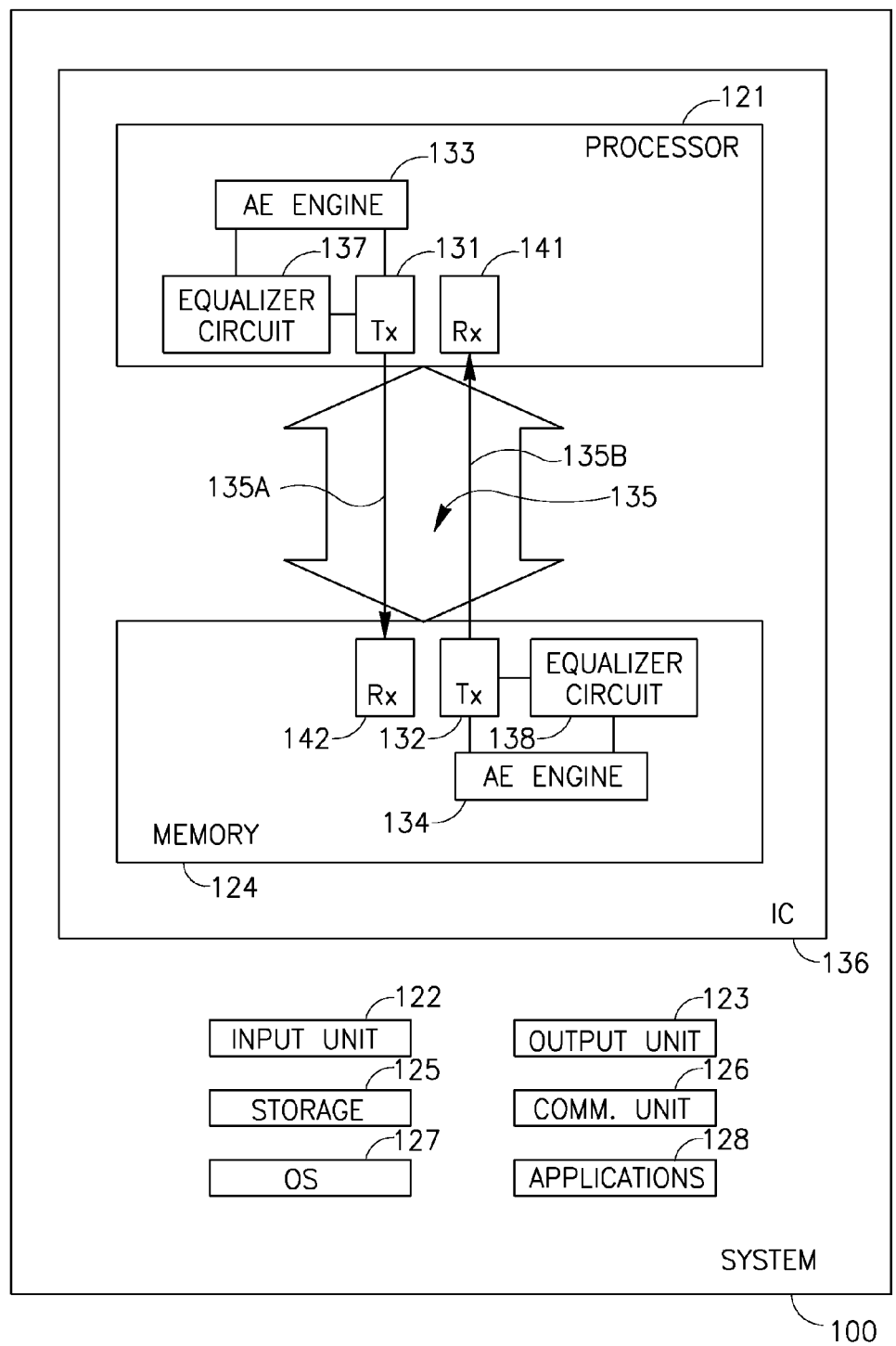
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" as used herein include, for example, "multiple" or "two or more". For example, "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smartphone" device, an iPhone™ device, a wired or wireless handheld device (e.g., BlackBerry®, Palm® Treo™, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), Zig-Bee™, Ultra-Wideband (UWB), Global System for Mobile communication (GSM), 2 G, 2.5 G, 3 G, Third Generation Partnership Project (3GPP), 3GPP Long Term Evolution (LTE), 3.5 G, or the like. Some embodiments may be used in conjunction with various other devices, systems and/or networks.

As an overview, some embodiments include devices, systems, and methods of detecting frame marker quality. Some embodiments utilize decode permissiveness to allow frame markers identification over a "noised" or imperfect link or medium.

In some embodiments, an Adaptive Equalization (AE) engine is utilized by High-Speed Serial (HSS) units to facilitate the identification of frame markers over a noisy link. For example, the AE engine may search for, and may identify, masked patterns that are similar (but not identical) to the actual pattern sent as frame marker on the noisy link. The AE engine may determine the quality of the link, and may report the determined link quality to other layers of the computing system, for example, for tuning of link coefficients.

FIG. 1 schematically illustrates a block diagram of a system 100 in accordance with some demonstrative embodiments. System 100 may be, for example, a desktop computer, a laptop computer, a notebook computer, a server computer, a tablet computer, a PDA device, a cellular phone, a mobile phone, a computing device, or the like.

Although portions of the discussion herein relate, for demonstrative purposes, to system 100 implemented as a computer or a computing system, some embodiments may be used in conjunction with other suitable implementations of system 100. For example, some embodiments, system 100 may be implemented using, or within, a device or system able to operate in accordance with Backplane Ethernet standard; a device or system able to operate in accordance with IEEE 802.3 standard; a device or system able to operate in accordance with IEEE 802.3ap standard; a device or system able to operate in accordance with a communication standard or protocol related to printed circuit boards and/or to Integrated Circuits (ICs); routing devices or systems; a network router; a network switch; a network hub; a switching unit or switching device; a line card; an Integrated Circuit (IC); or the like.

System 100 may be implemented using suitable hardware components and/or software components, for example, a processor 121, an input unit 122, an output unit 123, a memory unit 124, a storage unit 125, and a communication unit 126.

Processor 121 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 121 executes instructions, for example, of an Operating System (OS) 127 or of one or more applications 128.

Input unit 122 includes, for example, a keyboard, a keypad, a mouse, a touch-pad, a touch-screen, a joystick, a track-ball, a stylus, a microphone, or other suitable pointing unit or input device.

Output unit 123 includes, for example, a monitor, a screen, a touch-screen, a Cathode Ray Tube (CRT) display unit, a Liquid Crystal Display (LCD) display unit, a plasma display unit, one or more audio speakers or earphones, or other suitable output devices.

Memory unit 124 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units.

Storage unit 125 includes, for example, a hard disk drive, a floppy disk drive, a Compact Disk (CD) drive, a CD-ROM drive, a Digital Versatile Disk (DVD) drive, an internal or external database or repository, or other suitable removable or non-removable storage units. Memory unit 124 and/or storage unit 125, for example, store data processed by system 120.

Communication unit 126 includes, for example, a wired or wireless transceiver, a wired or wireless modem, a wired or wireless Network Interface Card (NIC), or other unit suitable for transmitting and/or receiving communication signals, blocks, frames, transmission streams, packets, messages and/or data. Optionally, communication unit 126 includes, or is associated with, one or more antennas or one or more sets of antennas.

In some embodiments, some or all of the components of system 120 are enclosed in a common housing or packaging, and are interconnected or coupled using one or more wired or wireless links. In other embodiments, components of system 120 are distributed among multiple or separate devices or locations.

Although portions of the discussion herein relate, for demonstrative purposes, to a link or links between processor 121 and memory unit 124, some embodiments may be used in conjunction with one or more links connecting other types of units.

In some embodiments, processor 121 and memory unit 124 may be co-located on a common Integrated Circuit (IC) 136 or a common hardware card or unit, and may be interconnected using a wired link 135. The wired link 135 may include, for example, a High Speed Serial (HSS) link, an Ethernet link, a wired connection, or the like. In some embodiments, the wired link 135 may include multiple sub-links or channels, e.g., one or more uplinks and one or more downlinks. For example, a HSS link 135A may transfer data and/or signals from a transmitter 131 of processor 121 to a receiver 141 of memory unit 124; and a HSS link 135B may transfer data and/or signals from a transmitter 132 of memory unit 124 to a receiver 142 of processor 121.

Transmitter 131 includes, or is associated with, an equalizer circuit 137, which may be configured by an AE engine 133 prior to sending payload data from transmitter 131 to receiver 141 over the link 135A. For example, if the equalizer circuit 137 of transmitter 131 is not properly configured, then attempts to send data from transmitter 131 to receiver 141 at the operational baud rate of system 100 may not meet the specified Bit Error rate (BER) requirements of system 100.

Similarly, transmitter 132 includes, or is associated with, an equalizer circuit 138, which may be configured by an AE engine 134 prior to sending payload data from transmitter 132 to receiver 142 over the link 135B. For example, if the equalizer circuit 138 of transmitter 132 is not properly configured, then attempts to send data from transmitter 132 to receiver 142 at the operational baud rate of system 100 may not meet the specified Bit Error rate (BER) requirements of system 100.

The AE engines 133-134 may perform, for example, a link training process or a "handshake" phase in which the link 135 characteristics are determined. As a result of the training process, "locking" of the link 135 (or of sublinks 135A and/or 135B) may be achieved, as well as determination and reporting of the quality of link 135 (or of sublinks 135A and/or 135B).

Although portions of the discussion herein relate, for demonstrative purposes, to training, characterizing and/or locking of the sublink 135A which allows to send data payload from the transmitter 131 of processor 121 to the receiver 141 of memory unit 124, similar mechanisms and methods may be used with regard to data flow in the opposite direction, namely, from the transmitter 132 of memory unit 124 to the receiver 141 of processor 121 through the sublink 135B.

In order to properly set the equalization of transmitter 131, namely, to configure the equalizer circuit 137, information from the receiver 141 is used to discover the characteristics of the particular link 135 or the particular sublink 135A. This information is further used to adapt the settings of the equalizer circuit 137, and to converge on optimal or near-optimal settings. This training process may require the reliable exchange of information between the transmitter 131 and the receiver 141, for example, during substantially all the stages of the training process. In some full-duplex interfaces, in which each serial link from a first node to a second node has a corresponding opposite serial link from the second node to the first node, the corresponding opposite serial link may be used as a back-channel to transfer information from the receiver back to the transmitter. For example, sublink 135B may be used as a back-channel to transfer information back from receiver 142 to transmitter 131. However, since this communication occurs during the training process, and not after completion of the training process, reliable communication at the operational baud rate of the system may not yet be available. Therefore, training data is encoded using a suitable code, such that the effective baud rate of the training communication is reduced. In addition, the protocol allows the receiver 142 to determine a reference point within the data stream in order to properly decode command and status content.

In some embodiments, the encoding of training communication data utilizes a block code in order to constrain the minimum and maximum "run length" of the data; the run length corresponds to the number of consecutive "one" or "zero" bits. For example, some embodiments may utilize training communication in accordance with, or similar to, the IEEE 802.3 Clause 72 protocol, which specifies a Manchester code transmitted at ⅛-th baud rate for encoding bits of the training communication. For example, substantially each bit of the training communication data is encoded with an 8-bit block code having a minimum run length of 4 and a maximum run length of 8. The minimum run length is sufficiently large to ensure that training communication occur despite the transmitter equalizer 137 being set in a non-optimal manner. The maximum run length is sufficiently small to ensure that the receiver 142 Clock and Data Recovery (CDR) process still identifies signal transitions that are sufficient to lock to the data signal. Other protocols or standards utilizing adaptive equalization may be used, and may utilize block codes having characteristics of a minimum run length (denoted Lmin) and a maximum run length (denoted Lmax).

The communication protocol may further provide a reference point, such that the receiver 142 may be able to properly decode command and status content of the data stream. For example, the reference point may be provided by organizing or dividing the training data into frames, and by using a fixed data pattern as a frame marker (or frame header) to indicate the beginning of each frame. Once the beginning of the frame is known, bits may be interpreted based on their position or offset within the frame. The data pattern used as a frame marker ("FM") is a data pattern which may not typically occur within the data stream, e.g., to avoid aliasing. For example, aliasing may be avoided by using a frame marker having a minimum run length, denoted Fmin, which is greater than the maximum run length of the block code (namely, such that Fmin>Lmax). Some embodiments may utilize, for example, an IEEE 802.3 clause 72 protocol which uses a 32-bit frame marker of xFFFF0000, for which the value of Fmin is 16.

The communication protocol may require that the receiver 142 detect the frame marker before training frames may be received and the training process may commence. Since the minimum run length of the block code (Lmin) sufficiently constrains the spectral content of the signal, reliable communication may be achieved despite the fact that data is not yet equalized properly. However, depending on the setting of the equalizer circuit 137 of the transmitter 131, the rise and fall time of signal edges may be degraded, such that actual edge position may be ambiguous. For example, the xFFFF0000 framing pattern may be incorrectly received as xFFFE0000 or xFFFF8000, due to the signal edge being early or late relative to its nominal position. As the number of taps on the equalizer circuit 137 of the transmitter 131 increases, the ambiguity in edge position may increase, denoted represented na; the value of this parameter may be arbitrarily large.

In some embodiments, if Fmin−na is not greater than Lmax, then the frame marker may no longer be unique in the data stream, and aliasing may occur. Accordingly, in some embodiments, the value of Fmin may be set to be sufficiently greater than the value of Lmax, for example, by including a margin beyond the expected na value. However, if the communication protocol utilizes a fixed length frame (e.g., as does the IEEE 802.3 clause 72 protocol), and the frame marker repeats in the data stream at the correct interval, then it is likely that the frame marker has been found and is not an alias even if na is large and even if Fmin−na is not greater than Lmax.

Some embodiments may require that na be smaller than Lmin, for example, to ensure the that ambiguity in edge position may not exceed the range required for decoding data bits based on a fixed sampling point. Accordingly, some embodiments may not declare frame lock for a degraded signal that does not meet the condition of na<Lmin, and reliable training communication may not be achieved if this condition is not met.

In some embodiments, the quality level of the received serial link signal may be denoted Qn, where n may be equal to na. For example, the maximum Qn level allowed for a given system corresponds to n, which is equal to na, which may be equal to Lmin−1. In some embodiments, the training communication protocol is selected or configured such that Fmin−na>Lmax, aliasing may still be possible; therefore, therefore the frame marker repeats at a fixed interval in order to be considered valid.

In some embodiments, a three-phase process may be used. The first phase includes, for example, determination or definition of frame marker mask values for frame marker detection corresponding to each quality level Qn, where n equals zero, one, two, etc. The second phase includes, for example, a Finite State Machine (FSM) to search for a frame marker and determine whether or not the frame marker repeats at the correct interval. The third phase includes, for example, an algorithm for searching through Qn levels until frame markers are found and lock is achieved.

In some embodiments, frame markers are, or are assumed to be, a fixed data pattern having a bit length denoted Fmax, which occur at intervals of Lframe clock cycles. The value of Lframe is determined by the length of the frame (e.g., defined by the communication protocol) and the data path width (e.g., determined by the particular implementation).

The first phase includes, for example, determination or definition of frame marker mask values for frame marker detection corresponding to each quality level Qn. For example, some embodiments may define masked frame marker bit patterns used for detection of the frame markers in the data stream. Masked frame marker bit patterns are built based on the position of transitions of signal levels at the start of the frame marker, at the end of the frame marker, and/or within the frame marker.

The first phase may utilize one or more rules for constructing frame marker masks. For example, a first rule may specify that quality level Q0 corresponds to frame markers using the exact bit pattern as defined by the communication protocol. A second rule may specify the quality level Qn for values of n that are greater than or equal to one; for example, the quality level Qn corresponds to detection of frame markers wherein: the first (int (n+1)/2) bits after each signal transition in the frame marker are masked out, and the first (int(n/2)) bits before each signal transition in the frame marker are masked out. The int( ) function truncates the result of the division, rounding down to the nearest integer.

In some embodiments, for example, utilizing the IEEE 802.3 Clause 72 protocol, the rules may result in a list or table of quality levels, corresponding to masked frame marker bit patterns. In some embodiments, for example, the following table, denoted Table 1, may be used:

TABLE 1

| Quality Level | Masked Frame Marker Bit Pattern |
|---|---|
| Q0 | 1111_1111_1111_1111_0000_0000_0000_0000 |
| Q1 | X111_1111_1111_1111_X000_0000_0000_0000 |
| Q2 | X111_1111_1111_111X_X000_0000_0000_000X |
| Q3 | XX11_1111_1111_111X_XX00_0000_0000_000X |

In Table 1, the character "X" denotes a bit having a value of either one or zero. In some embodiments, a masked frame marker bit pattern may have an edge bit which is different from an edge bit of an uncorrupted frame marker; or, a masked frame marker bit pattern may have multiple edge bits or near-edge bits which are different from multiple, respective, edge bits or near-edge bits of an uncorrupted frame marker. In some embodiments, for example, quality level Q4 may correspond to failure to detect frame markers. Some embodiments may be used in conjunction with bounded quality levels, in which the quality level may be one of multiple possible values or may be from a closed list of possible quality values. Other embodiments may be used in conjunction with open-ended or unbounded quality levels, and need not necessarily utilize a pre-defined closed list of possible quality levels, and/or need not necessarily utilize a particular quality level which corresponds to failure to detect frame markers.

Figure 2:
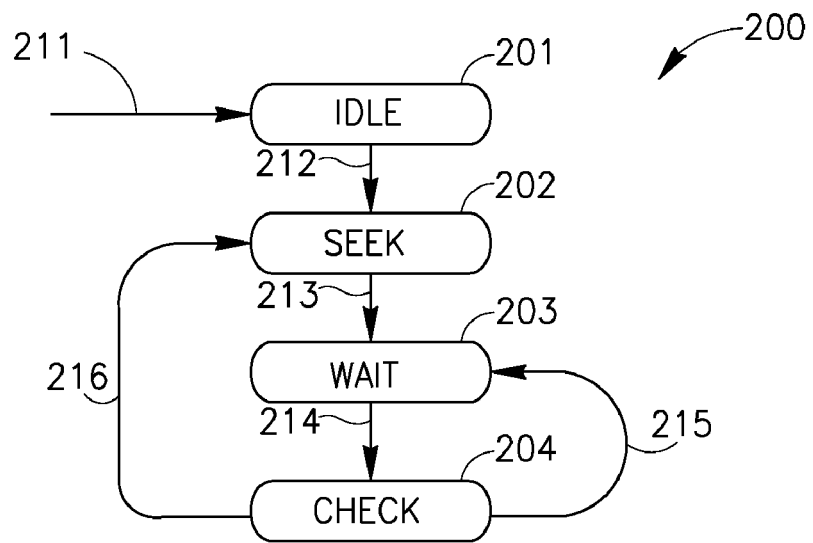
FIG. 2 is a schematic illustration of a state diagram of a frame marker lock Finite State Machine (FSM) in accordance with some demonstrative embodiments of the invention.

Reference is made to FIG. 2, which schematically illustrates a state diagram of a frame marker lock Finite State Machine (FSM) 200 in accordance with some demonstrative embodiments. The lock FSM 200 may search for a frame marker and determine whether or not the frame marker repeats at the correct interval. The lock FSM 200 may be used, for example, in the second phase of the process described with reference to FIG. 1.

The lock FSM 200 may include multiple states, for example, an idle state 201, a seek state 202, a wait state 203, and a check state 204. Arrows 211-216 indicate transitions between states.

In the idle state 201, substantially no locking effort is performed.

In the seek state 202, a search is conducted for frame marker matching based on the masked frame marker bit patterns defined in the first phase. In some embodiments, all the possible bit alignments are searched simultaneously, in parallel and/or concurrently. If any match is found, the bit alignment of the incoming data is adjusted so that the frame marker is aligned with the masked frame marker bit pattern.

The wait state 203 indicates waiting for a pre-defined time period. For example, the waiting time period may correspond to the number of clock cycles that correspond to the value of Lframe.

In the check state 204, a check is conducted to determine whether or not the received data matches the masked frame marker bit pattern, and has the correct alignment. The check operation may be performed using comparator logic, e.g., on the same offset.

As indicated by arrow 211, a transition to idle state 201 occurs upon transition of the quality FSM, for example, from Qn to Qn+1, or from Qn to Qn−1. For example, when the quality FSM transits between quality states (e.g., Q0, Q1, Q2, and Q3), the lock FSM 200 transits to idle state 201 and restarts using the new quality mask.

As indicate by arrow 212, an Unconditional Transition (UCT) occurs from idle state 201 to seek state 202.

As indicated by arrow 213, a transition from seek state 202 to wait state 203 occurs upon a "hit", namely, a detection of a frame marker based on matching of incoming data with a masked frame marker bit pattern.

As indicated by arrow 214, a transition from wait state 203 to check state 204 occurs after the pre-defined waiting period elapses, for example, after 136 clock cycles.

As indicated by arrow 215, a transition from check state 204 to wait state 203 occurs if: a "same hit" condition exists, such that two "hits" are detected consecutively using the same masked frame marker bit pattern; or, alternatively, if a lock condition exists, and a "miss" condition exists, and the number of consecutive "bad" frame markers is smaller than a threshold value (e.g., five). A lock condition is declared, for example, after two consecutive "same hits".

As indicated by arrow 216, a transition from check state 204 to seek state 202 occurs if: a miss exists, and a lock condition does not exist; or, alternatively, a lock exists, and a miss exists, and the number of consecutive "bad" frame markers is equal to or smaller than the threshold value (e.g., five).

Figure 3:
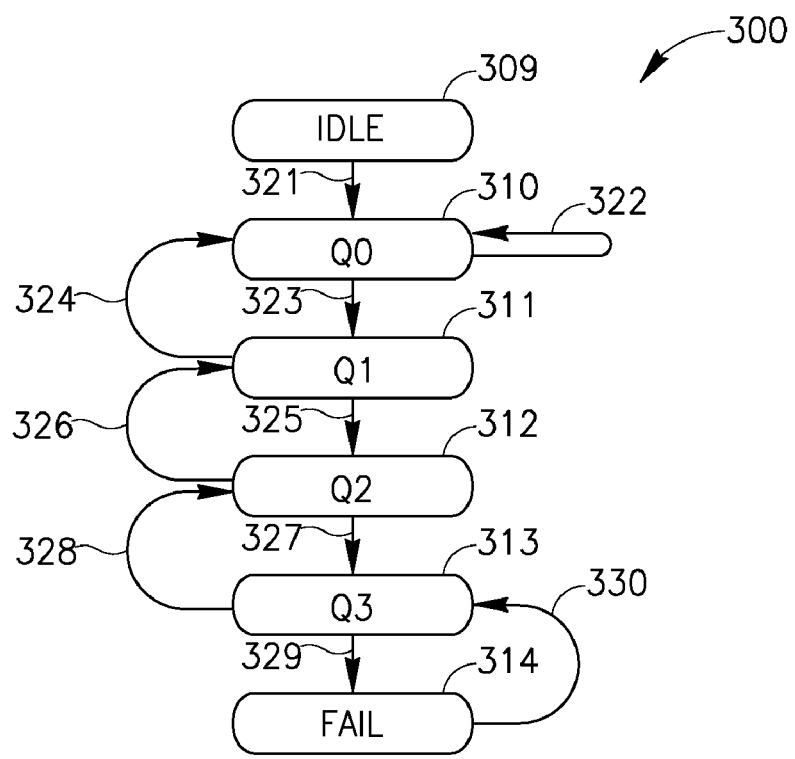
FIG. 3 is a schematic illustration of a state diagram of a frame marker quality Finite State Machine (FSM) in accordance with some demonstrative embodiments of the invention.

Reference is made to FIG. 3, which schematically illustrates a state diagram of a quality Finite State Machine (FSM) 300 in accordance with some demonstrative embodiments. The quality FSM 300 may operate in accordance with an algorithm for searching through Qn levels until frame markers are found and lock is achieved. The quality FSM 300 may be used, for example, in the third phase of the process described with reference to FIG. 1.

In some embodiments, the quality FSM 300 may operate in accordance with a quality level search algorithm which may be similar to the demonstrative algorithm presented herein as pseudo-code, denoted Code 1:

---
Code 1
---
set i = 0 ;
while ( i ≦ maximum quality level) begin
   try to lock on quality level Qi ;
   if LOCK on quality level Qi then report quality level Qi and exit ;
   increment i ;
end ;

---

The quality FSM 300 may include multiple states, for example, an idle state 309, a quality level Q0 state 310, a quality level Q1 state 311, a quality level Q2 state 312, a quality level Q3 state 313, and a fail state 314. For demonstrative purposes, four quality levels are shown (namely, Q0, Q1, Q2, and Q3); in some embodiments, other number of quality levels may be used. Arrows 321-330 indicate transitions between states.

In the idle state 301, substantially no locking effort is performed.

In the quality level Q0 state 310, an attempt is made to lock on the masked frame marker bit pattern that corresponds to quality level Q0 (for example, the bit pattern exactly as defined by the communication protocol).

In the quality level Q1 state 311, an attempt is made to lock on the masked frame marker bit pattern that corresponds to quality level Q1 (for example, a bit pattern having one "incorrect" bit in comparison to the bit pattern defined by the communication protocol).

In the quality level Q2 state 312, an attempt is made to lock on the masked frame marker bit pattern that corresponds to quality level Q2 (for example, a bit pattern having two "incorrect" bits in comparison to the bit pattern defined by the communication protocol).

In the quality level Q3 state 313, an attempt is made to lock on the masked frame marker bit pattern that corresponds to quality level Q3 (for example, a bit pattern having three "incorrect" bits in comparison to the bit pattern defined by the communication protocol).

The fail state 314 corresponds to failure to lock.

As indicated by arrow 321, the FSM 300 transits from idle state 309 to quality level Q0 state 310, thereby starting the process to attempt to lock.

As indicated by arrow 322, if quality level Q0 is locked, then quality level Q0 is reported, and the quality level Q0 state 310 is maintained.

In contrast, as indicated by arrow 323, a transition from quality level Q0 state 310 to quality level Q1 state 311 occurs if no lock is achieved on quality level Q0 for a pre-defined locking attempt period, denoted T.

As indicated by arrow 324, a transition from quality level Q1 state 311 to quality level Q0 state 310 occurs if quality level Q1 is locked; and the quality level Q1 is reported.

In contrast, as indicated by arrow 325, a transition from quality level Q1 state 311 to quality level Q2 state 312 occurs if no lock is achieved on quality level Q1 for a pre-defined locking attempt period, denoted T.

As indicated by arrow 326, a transition from quality level Q2 state 312 to quality level Q1 state 311 occurs if quality level Q2 is locked; and the quality level Q2 is reported.

In contrast, as indicated by arrow 327, a transition from quality level Q2 state 312 to quality level Q3 state 313 occurs if no lock is achieved on quality level Q2 for a pre-defined locking attempt period, denoted T.

As indicated by arrow 328, a transition from quality level Q3 state 313 to quality level Q2 state 312 occurs if quality level Q3 is locked; and the quality level Q3 is reported In contrast, as indicate by arrow 329, a transition from quality level Q3 state 313 to fail state 314 occurs if no lock is achieved on quality level Q3 for a pre-defined locking attempt period, denoted T.

As indicated by arrow 330, an Unconditional Transition (UCT) occurs from the fail state 314 to the quality level Q3 state 313; and the failure to lock on quality level Q3 is reported.

The locking attempt period, denoted T, may be in accordance with the communication protocol. For example, in some embodiments utilizing the IEEE 802.3 Clause 72 protocol, the value of T may be equal to N times 137 clock cycles, wherein N denotes an integer. In other embodiments, the value of T may be equal to N times Lframe clock cycles, wherein N denotes an integer. In some embodiments, the value of N may be configurable, and/or may be equal to the number of masked frame marker bit patterns used.

Figure 4:
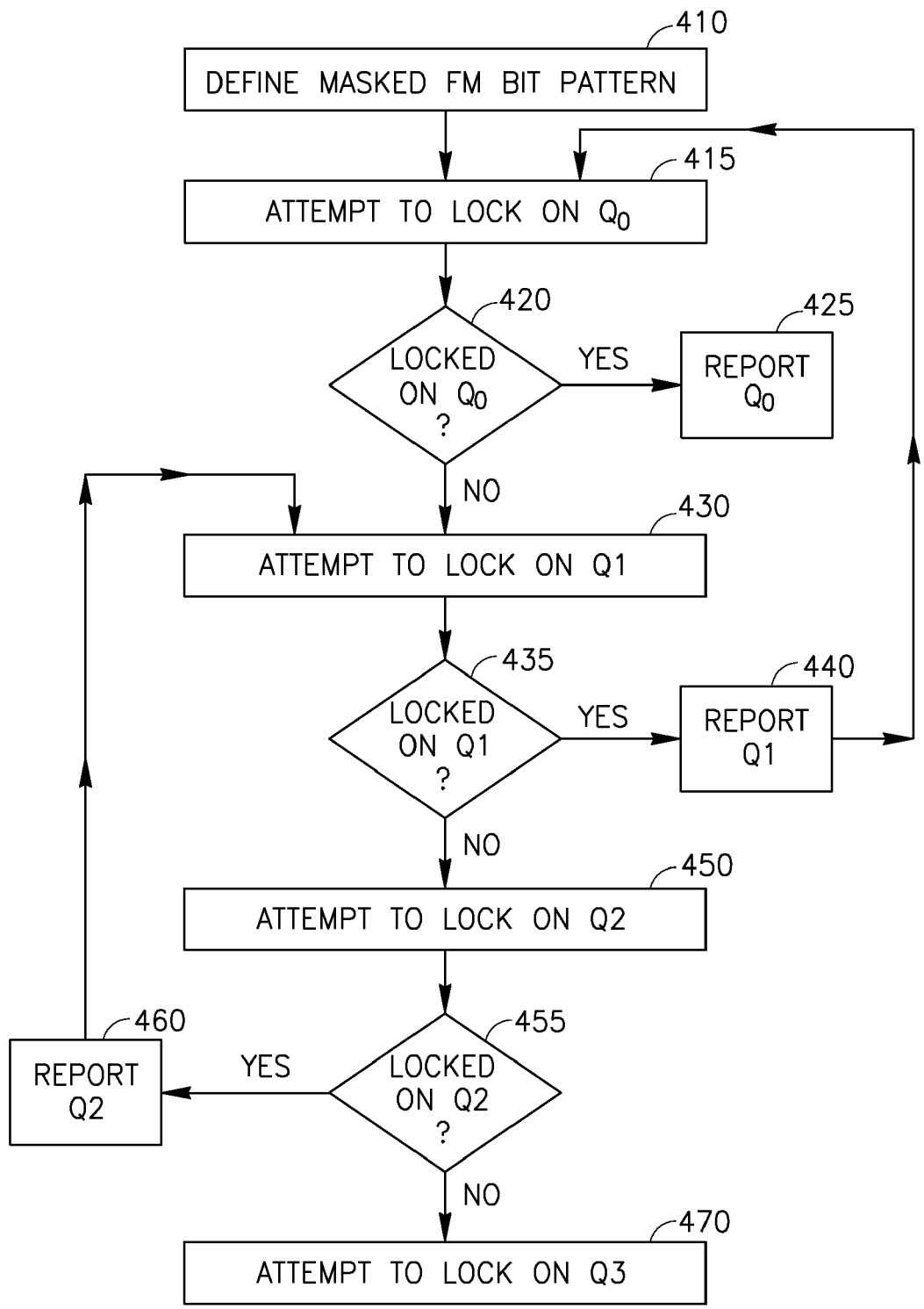
FIG. 4 is a schematic flow-chart of a method of detecting frame marker quality, in accordance with some demonstrative embodiments of the invention.

FIG. 4 is schematic flow-chart of a method of detecting frame marker quality, in accordance with some demonstrative embodiments. Operations of the method may be used, for example, by system 100 of FIG. 1, and/or by other suitable units, devices and/or systems.

In some embodiments, the method may include, for example, defining masked frame marker bit patterns (block 410).

In some embodiments, the method may include, for example, analyzing the incoming data stream in attempt to lock on quality level Q0 (block 415).

In some embodiments, the method may include, for example, checking whether or not a lock is achieved on quality level Q0 (block 420).

If a lock is achieved on quality level Q0, then the method may include, for example, reporting the lock on quality level Q0 (block 425).

In contrast, if a lock is not achieved on quality level Q0, then the method may proceed with the operations of blocks 430 and onward.

In some embodiments, the method may include, for example, analyzing the incoming data stream in attempt to lock on quality level Q1 (block 430).

In some embodiments, the method may include, for example, checking whether or not a lock is achieved on quality level Q1 (block 435).

If a lock is achieved on quality level Q1, then the method may include, for example, reporting the lock on quality level Q1 (block 440), and proceeding with the operations of block 415 and onward.

In contrast, if a lock is not achieved on quality level Q1, then the method may proceed with the operations of blocks 450 and onward.

In some embodiments, the method may include, for example, analyzing the incoming data stream in attempt to lock on quality level Q2 (block 450).

In some embodiments, the method may include, for example, checking whether or not a lock is achieved on quality level Q2 (block 455).

If a lock is achieved on quality level Q2, then the method may include, for example, reporting the lock on quality level Q2 (block 460), and proceeding with the operations of block 430 and onward.

In contrast, if a lock is not achieved on quality level Q2, then the method may proceed with the operations of blocks 470 and onward.

In some embodiments, the method may include, for example, analyzing the incoming data stream in attempt to lock on quality level Q3 (block 470). Operations similar to the above may be used and repeated, for example, until a threshold quality level is reached, corresponding to failure to lock.

Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution Some embodiments include methods to define and detect the quality of frame markers sent over a communication link, e.g., an IEEE 802.3 Clause 72 communication link. Some embodiments may allow faster locking on the data stream, and may allow improved tuning of the link. Some embodiments may allow detection of incoming, degraded, frame markers which may be difficult to detect due to a "noisy" link, and since link characteristics are not yet known at the link locking phase. Some embodiments may allow detection of corrupted, degraded, slightly-incorrect or imperfect frame markers, for example, having a pattern of xFFFE0000 or xFFFF8000, instead of correct and unimpaired frame markers having a value of xFFFF0000. The detection of the degraded or corrupted frame markers may allow link locking and link training. Some embodiments may use masked data in order to detect frame markers over noisy link; once the quality of the frame marker (denoted Qn) is detected, upper layers may bring the link up with the given quality. The quality indicator Qn may further assist in determining which algorithm to utilize in order to tune or modify the link coefficients. In some embodiments, at the end of the link training process and tuning of link coefficient, a quality level of Q0 is detected.

Some embodiments allow to detect, at substantially any point in time, the quality of the frame marker received. The quality of a frame marker may be defined, for example, as the difference between the "ideal" or uncorrupted or protocol-compliant frame marker, and the frame marker actually received over the link. For example, a Q0 frame marker is identical to the "ideal" frame marker, having a value of xFFFF0000; a Q1 frame marker includes an erosion of one bit (from the "ideal" frame marker) when changing polarity; a Q2 frame marker includes an erosion of two bits (from the "ideal" frame marker) when changing polarity; and so on. In some embodiments, the method may be performed in parallel to the tuning of the link coefficient, and may not interfere with the link training and/or locking mechanism. In some embodiments, the method is dynamic, such that reported quality levels are continuously refined during the link training process.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-RAN), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the appended claims are intended to cover all such modifications, substitutions, changes, and equivalents.

What is claimed is:

1. A method of detecting frame marker quality, the method comprising:
    detecting, in a bit-stream sent from a first component to a second component of a common hardware unit, a frame marker having a bit pattern different from an uncorrupted frame marker specified by a communication protocol;
    assigning a quality level indicator to the frame marker based on a difference between said bit pattern and a bit pattern of said uncorrupted frame marker;
    attempting to lock on the communication link based on a first value of frame marker quality level indicator;
    if the attempt is unsuccessful, attempting to lock on the communication link based on a second value of frame marker quality level indicator, and
    wherein the second value is smaller than the first value.

2. The method of claim 1, wherein detecting the frame marker comprises: comparing between a sequence of bits of said bit-stream and one or more masked bit patterns.

3. The method of claim 2, wherein the one or more masked bit patterns comprises a bit pattern having an edge bit which is different from an edge bit of said uncorrupted frame marker.

4. The method of claim 1, comprising:
    reporting the quality level indicator of the detected frame marker to a communication layer configured to train the communication link.

5. The method of claim 4, comprising:
    modifying a coefficient of the communication link using a training algorithm that takes into account the quality level indicator of the frame marker.

6. The method of claim 1, comprising:
    during a training process of the communication link, substantially continuously repeating to detect frame markers and to assign quality level indicators to the frame markers.

7. The method of claim 1, wherein the communication protocol comprises an IEEE 802.3 Clause 3 communication protocol.

8. An apparatus for detecting frame marker quality, the apparatus comprising:
    an adaptive equalization engine to detect, in a bit-stream sent from a first component of the apparatus to a second component of the apparatus, a frame marker having a bit pattern different from an uncorrupted frame marker specified by a communication protocol, and to assign a quality level indicator to the frame marker based on a difference between said bit pattern and a bit pattern of said uncorrupted frame marker; and
    wherein the adaptive equalization engine is operative to attempt to lock on the communication link based on a first value of frame marker quality level indicator, and, if the attempt is unsuccessful, to attempt to lock on the communication link based on a second value of frame marker quality level indicator, wherein the second value is smaller than the first value.

9. The apparatus of claim 8, wherein the adaptive equalization engine is to compare between a sequence of bits of said bit-stream and one or more masked bit patterns.

10. The apparatus of claim 9, wherein the one or more masked bit patterns comprises a bit pattern having an edge bit which is different from an edge bit of said uncorrupted frame marker.

11. The apparatus of claim 8, wherein the adaptive equalization engine is to report the quality level indicator of the detected frame marker to a communication layer configured to train the communication link.

12. The apparatus of claim 11, wherein the adaptive equalization engine is to modify a coefficient of the communication link using a training algorithm that takes into account the quality level indicator of the frame marker.

13. The apparatus of claim 8, wherein during a training process of the communication link, the adaptive equalization engine is to substantially continuously repeat to detect frame markers and to assign quality level indicators to the frame markers.

14. The apparatus of claim 8, wherein the communication protocol comprises an IEEE 802.3 Clause 3 communication protocol.

15. The apparatus of claim 8, wherein the apparatus comprises a hardware unit selected from the group consisting of: an integrated circuit, a printed circuit board, a network routing unit, and a network switching unit.

16. A system comprising:
   an integrated circuit comprising:
   - a first component comprising a first transmitter and a first receiver;
   - a second component comprising a second transmitter and a second receiver;
   - one or more wired communication links to connect the first transmitter with the second receiver, and to connect the second transmitter with the first receiver;
   - an adaptive equalization engine to detect, in a bit-stream sent from the first transmitter to the second receiver, a frame marker having a bit pattern different from an uncorrupted frame marker specified by a communication protocol, and to assign a quality level indicator to the frame marker based on a difference between said bit pattern and a bit pattern of said uncorrupted frame marker; and
   - wherein the adaptive equalization engine is operative to attempt to lock on the communication link based on a first value of frame marker quality level indicator, and, if the attempt is unsuccessful, to attempt to lock on the communication link based on a second value of frame marker quality level indicator, wherein the second value is smaller than the first value.

17. The system of claim 16, wherein the integrated circuit comprises an equalizer circuit associated with the first transmitter, and wherein the adaptive equalization engine is to modify a coefficient of equalizer circuit the using a training algorithm that takes into account the quality level indicator of the frame marker.

18. The system of claim 16, wherein during a training process of the one or more wired communication links, the adaptive equalization engine is to substantially continuously repeat to detect frame markers and to assign quality level indicators to the frame markers.

\* \* \* \* \*